United States Patent
Baret

Patent Number: 5,115,667
Date of Patent: May 26, 1992

[54] CIRCUIT FOR PROCESSING A SIGNAL RECEIVED BY AN ELECTRON MULTIPLIER

[75] Inventor: Gilles Baret, Annecy, France

[73] Assignee: Alcatel Cit, Paris, France

[21] Appl. No.: 535,621

[22] Filed: Jun. 11, 1990

[30] Foreign Application Priority Data

Jun. 16, 1989 [FR] France ................ 89 08047

[51] Int. Cl.[5] .................. G01M 3/20; H01J 43/30
[52] U.S. Cl. .................. 73/40.7; 356/226; 330/42; 313/103 R
[58] Field of Search ............ 340/632; 250/283, 299; 356/326, 226; 73/40.7; 330/42; 313/103; 328/243

[56] References Cited

U.S. PATENT DOCUMENTS 4,823,004  4/1989  Kaiser et al. .................. 250/306
4,996,422  2/1991  Mitsui et al. .................. 250/299

Primary Examiner—Hezron E. Williams
Assistant Examiner—Michael Brock
Attorney, Agent, or Firm—Sughrue, Mion, Zinn, Macpeak & Seas

[57] ABSTRACT

The present invention relates to a circuit for processing a signal received by an electron multiplier. The circuit comprises an electron multiplier followed by an electron collector, a power supply for the electron multiplier, a gain-compressing amplifier for processing the signal delivered by the electron collector, and a feedback path for continuously modulating the gain of the electron multiplier by means of a control circuit which acts on the HT power supply of the electron multiplier. This circuit is particularly suitable for use in mass spectrometry and in helium leak detection.

6 Claims, 1 Drawing Sheet

CIRCUIT FOR PROCESSING A SIGNAL RECEIVED BY AN ELECTRON MULTIPLIER

The present invention relates to a circuit for processing a signal received by an electron multiplier.

BACKGROUND OF THE INVENTION

Electron multipliers are components that provide amplification. Their gain is generally very high, and may be as much as $10^4$ or $10^5$. They are used in various applications where very weak signals are processed. For example, such applications include: measuring light energy in the visible or the invisible portions of the spectrum (photomultipliers), image intensifiers, measuring nuclear radiation (ionization chambers), mass spectrometry, and in particular detecting leaks by means of helium.

In these applications, the signals to be processed may have a dynamic range of about $10^8$, in some cases. It is therefore necessary to have a measurement system which includes the electron multiplier and an amplifier for compressing the signal. The signal-compressing amplifier cannot, on its own, reduce the output dynamic range sufficiently. It is therefore necessary to act on the gain of the electron multiplier in order to a achieve additional compression. This is done by acting on its power supply voltage. In known circuits, the gain of the measurement system, in particular due to the action taken on the said power supply voltage, is controlled discontinuously either manually by using a switch or else, in more sophisticated systems, by automatic electronic switching, or else multiple measurement systems are used. This discontinuity in transfer function gives rise to undesirable effects such as long response times or instability whenever the signal is near the boundary between two amplification ranges, or else measurement curves join up incorrectly.

The object of the present invention is therefore to provide an improved circuit for processing a signal received by an electron multiplier, which circuit mitigates the above drawbacks.

SUMMARY OF THE INVENTION

The present invention therefore provides a circuit for processing the signal received by an electron multiplier, enabling said signal to be measured continuously over a large dynamic range while using a single method of processing, the circuit including said electron multiplier receiving the input signal, wherein said circuit includes a high tension power supply for said multiplier provided with control means, a feedback loop constituted by a gain-compressing amplifier delivering an output signal and also acting on the control means in such a manner as to vary the gain of the electron multiplier continuously over the entire measurement dynamic range as a function of the output signal from said electron multiplier, as received by an electron collector.

The transfer function between the input signal and the output signal may be a logarithmic function.

The gain of the electron multiplier may vary exponentially as a function of its power supply voltage.

In an embodiment of the invention, the gain-compressing amplifier in the feedback loop is a logarithmic amplifier.

Advantageously, the control circuit is a linear amplifier whose gain and reference parameters define the measurement range.

In an embodiment of the invention, the electron multiplier is a plate having microchannels.

The invention may be applied, in particular, to mass spectrometry and particularly to detecting a helium leak.

BRIEF DESCRIPTION OF THE DRAWING

An embodiment of the invention is described by way of example with reference to the accompanying drawing, in which.

DETAILED DESCRIPTION OF THE PREFERRED EMBODIMENT

When the same item appears in several of the figures, it is given the same reference in all of them.

Figure 1:
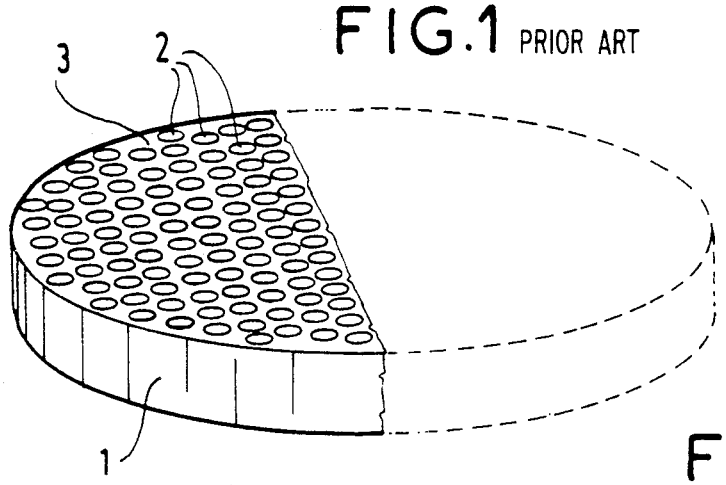
FIG. 1 shows a prior art electron multiplier of the type comprising a plate with microchannels.
Figure 2:
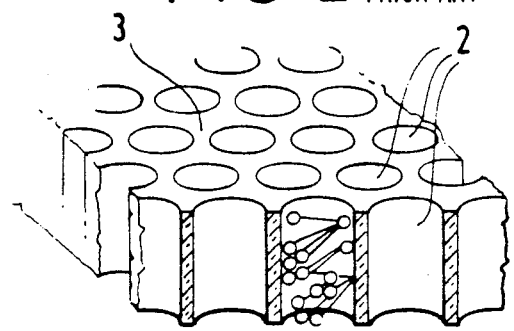
FIG. 2 is a fragmentary section through the microchannel plate of FIG. 1.

The microchannel plate 1 shown in FIGS. 1 and 2 transforms a flux of particles or photons into a flux of incident electrons, and it then acts on the flux of incident electrons like an electron multiplier. It may therefore easily be replaced by an assembly constituted by a cell for converting the flux of particles or photons into a flux of incident electrons, followed by an electron multiplier having dynodes.

The microchannel plate includes a multitude of channels 2 disposed approximately on the axis of the incident flux. Each channel constitutes an elementary electron multiplier.

The plate is coated with a layer of high resistivity having a secondary emission coefficient which is greater than unity. A high tension is applied between its two ends. Thus, a single incident electron generates a large number of electrons at the outlet of the plate by successive shocks as it progresses along a microchannel. The channels are electrically interconnected by means of metal coatings 3 on both of the two plane faces of the plate. The high tension applied across the plate generally lies in the range 400 volts to 1500 volts. It is tension which determines the gain of an electron multiplier.

Figure 3:
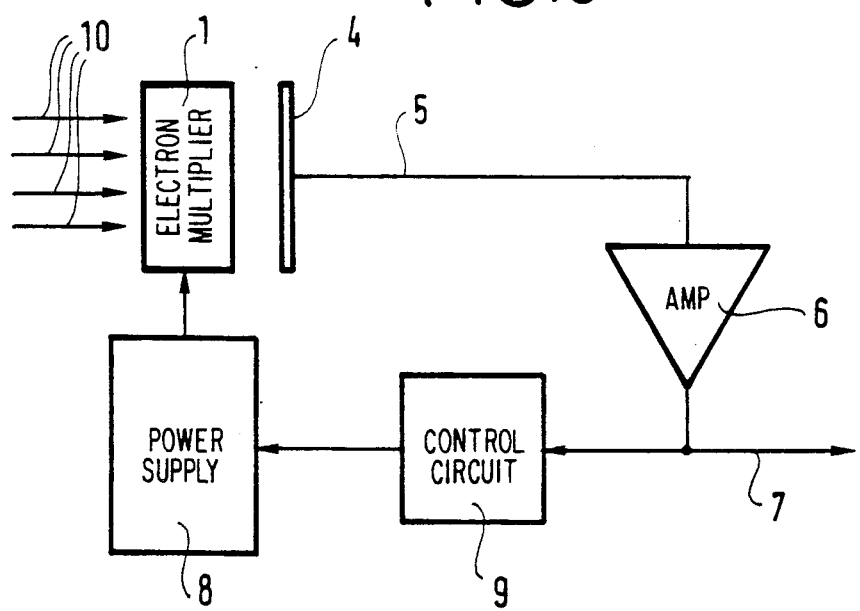
FIG. 3 is a diagram of the signal processing circuit of the invention.

The circuit of the invention is now described with reference to FIG. 3. The electron multiplier 1 such as a microchannel plate receiving a flux of particles 10 is followed by an electron collector 4 which produces an electrical current 5. This current is injected into a gain-compressing amplifier 6 which amplifies the signal and which compresses it so as to reduce its dynamic range. The output signal 7 from the gain-compressing amplifier is then used, in particular for display purposes. Advantageously, the gain-compressing amplifier comprises a logarithmic amplifier, thereby providing its gain-compression function.

The high tension power supply 8 of the electron multiplier is modulated by a control circuit 9 which receives the output signal 7. This power supply produces a tension which is a function of the signal applied to its control input, which tension is at a maximum when the electron current 5 is at a minimum or zero value, and is at a minimum when the electron current is at a maximum. This provides additional compression of the dynamic range of the measurement system. Since the gain-compressing amplifier 6 is a logarithmic amplifier, the control circuit 9 controlling the power supply of the multiplier may be a linear amplifier such that the high tension produced by the power supply is a linear function of the output signal 7, said function having a negative slope and varying between two limits. In this case, by using a microchannel plate whose gain is an exponential function of the high tension applied thereto, the output signal 7 is a logarithmic function of the incident particle flux.

Naturally, it is possible to design other types of feedback without going beyond the scope of the invention. The essential feature is that the transfer function of the circuit as a whole (the relationship between the value of the output signal 7 and the incident flux) should be known with the input value being unambigiously determined by the output signal from the circuit.

The circuit made in this way is therefore capable of processing an input signal having a large dynamic range.

The signal processing circuit of the invention is particularly suitable for use in mass spectrometry when used for detecting helium leaks. The idea is to measure the partial pressure of helium contained in the residual atmosphere inside an enclosure whose sealing is to be verified. Two cases commonly arise in practice. If the enclosure is large in volume, then it is evacuated by means of a pump, it is immersed in a surrounding atmosphere which is enriched in helium as a marker gas, and the gas being pumped out from the enclosure is analyzed in order to see whether it too is enriched in helium. If the enclosure is small, e.g. a box, then the box is filled with helium under pressure in one chamber after which it is disposed in a second chamber which is evacuated. The gas pumped out therefrom is analyzed in the same way in order to verify whether it is enriched in helium.

A leak detector therefore comprises a mass spectrometer including a filter whose aim is to deflect previously ionized gas molecules as a function of the ratio m/q, where m is the mass of the molecule and q is its charge. The spectrometer is located at the helium peak. At the outlet from the filter, a cell is disposed for converting incident helium ions into electrons. The electrons are then multiplied in an electron multiplier in order to create an electron current 5.

In the example under consideration, this conversion constitutes an integral portion of the electron multiplier which is a microchannel plate. The signal processing circuit of the invention thus serves to convert an incident flux of helium ions having a dynamic range of $10^8$ (varying approximately between $10^{-16}$ amps and $10^{-8}$ amps) into an electron current, and to amplify this electron current so as to produce an output signal 7, in particular for connection to a display system.

This application of the circuit to a helium leak detector is easily transposed to any other field that makes use of electron multiplication, merely by replacing the conversion cell, which cell serves to convert a flux of particles or photons into a flux of electrons.

I claim:

1. A circuit for processing an input signal received by an electron multiplier, enabling said signal to be measured continuously over a large dynamic measurement range while using a single method of processing, said circuit comprising said electron multiplier receiving the input signal, and wherein said circuit further comprises a high voltage power supply for said electron multiplier, a linear amplifier, said high voltage power supply being controlled by said linear amplifier, said linear amplifier having a negative slope, the gain and reference parameters of said linear amplifier defining said measurement range, and a gain-compressing logarithmic amplifier, said linear amplifier receiving the output of said gain-compressing logarithmic amplifier and said gain-compressing logarithmic amplifier acting on said linear amplifier in such a manner as to vary the gain of said electron multiplier continuously over the entire dynamic measurement range as a function of the output signal from said electron multiplier, as received by an electron collector, the output of said gain-compressing logarithmic amplifier also being the output signal of said circuit.

2. A signal processing circuit according to claim 1, wherein a transfer function between the input signal and the output signal has a logarithmic function.

3. A signal processing circuit according to claim 1, wherein the gain of the electron multiplier varies exponentially as a function of its power supply tension.

4. A signal processing circuit according to claim 1, wherein the electron multiplier is a microchannel plate.

5. Application of the circuit for processing a signal received by an electron multiplier according to claim 1 to mass spectrometry.

6. Application of the circuit for processing the signal received by an electron multiplier according to claim 1, for detecting leaks by using helium as a marker gas.

* * * * *